United States Patent
Field

[11] Patent Number: 5,287,184
[45] Date of Patent: Feb. 15, 1994

[54] TELEVISION RECEIVER FOR MICROWAVE RECEPTION WITH PROVISIONS FOR REDUCING INTERFERENCE

[75] Inventor: Edric H. Field, Chelmsford, Great Britain

[73] Assignee: Ferguson Limited, Enfield, Great Britain

[21] Appl. No.: 796,725

[22] Filed: Nov. 21, 1991

[30] Foreign Application Priority Data

Nov. 27, 1990 [GB] United Kingdom ............. 9025754

[51] Int. Cl.$^5$ ............................................ H04N 5/213
[52] U.S. Cl. ............................................ 348/615
[58] Field of Search ............ 358/167, 166, 163, 160, 358/336; H04N 5/213

[56] References Cited

U.S. PATENT DOCUMENTS

| | | | |
|---|---|---|---|
| 4,353,093 | 10/1982 | Durbin, Jr. et al. | 358/160 |
| 4,686,583 | 8/1987 | Tomita et al. | 358/336 |
| 4,807,032 | 2/1989 | Strehl | 358/167 X |
| 4,837,624 | 6/1989 | Heitmann et al. | 358/163 X |
| 4,875,106 | 10/1989 | Heitman | 358/336 X |
| 4,893,192 | 1/1990 | Takemura | 358/336 |
| 4,914,745 | 4/1990 | Strehl | 358/166 |

FOREIGN PATENT DOCUMENTS

| | | |
|---|---|---|
| 919217 | 2/1963 | United Kingdom . |
| 2052914 | 1/1981 | United Kingdom . |
| 2072457 | 9/1981 | United Kingdom . |
| 2206012 | 12/1988 | United Kingdom . |
| 2217095 | 10/1989 | United Kingdom . |

Primary Examiner—Victor R. Kostak
Attorney, Agent, or Firm—Joseph S. Tripoli; Peter M. Emanuel

[57] ABSTRACT

Interference induced amplitude changes in the television signals received by a receiver which receives satellite signals are eliminated by delaying the signals for an integer multiple of the receiver line time and substituting the delayed signals for the undelayed signals for the duration of the amplitude changes.

7 Claims, 1 Drawing Sheet

TELEVISION RECEIVER FOR MICROWAVE RECEPTION WITH PROVISIONS FOR REDUCING INTERFERENCE

BACKGROUND OF THE INVENTION

In most television receivers no appreciable degradation of the displayed picture is visible under normal reception and viewing conditions. However, degradation of the displayed picture may arise due to impulsive interference, for instance from radar signals.

Television receivers designed for reception of microwave signals, for instance from satellite transmissions, are particularly vulnerable to this type of interference, which may manifest itself as very small extreme white and dark areas superimposed on the picture information.

It is an object of the invention to minimize the visibility of such interference by simple means within the receiver.

SUMMARY OF THE INVENTION

According to the invention a level detector is provided which produces a switching pulse simultaneously with the interference in the received signal, and a switch actuated by said pulse, switches the signal path during said interference to a source of a substitute signal, reducing the visibility of the interference within the picture.

Said substitute signal may be a constant dc voltage of a mid-grey value of the luminance signal. It was found that a small interference area on the screen during interference is less visible if it is produced in grey and not in white or black. The substitute signal may also be the mean value of the luminance signal over a longer period of one or more lines.

In a preferred embodiment of the invention the substitute signal is the signal of a previous line made available by a delay device with a delay of one line period. In this case one input of said switch is connected to the output of the delay device the input of which being connected to the signal path. Preferably the input of said delay device is connected to the output of said switch so that the signal re-circulates and can be repeated for more than one line if necessary.

Preferably said level detector is fed with a baseband video signal and produces said pulse upon interference pulses extending beyond peak white and also upon interference pulses which extend beyond black level. In order to handle the composite video signal and also in order to maintain the color sub-carrier of the previous line preferably means are provided ensuring that an undelayed color carrier and a color carrier coming from said delay device fed to two inputs of said switch have the same phase. In one form of the invention adapted for PAL signals the delay device has a delay of two line periods. According to an alternative solution a color carrier modifier is provided within the undelayed or within the delayed signal path connected to the input of said switch said modificator eliminating the PAL phase alteration from line to line. Such a color carrier modificator is more fully described within DE-OS 1.814.879.

For handling a SECAM signal preferably a delay device is provided having a delay of two line periods. This is necessary because the SECAM signal is a sequential signal carrying the two color difference signals on alternate lines.

For a MAC signal a window signal generator is provided so that for an interference pulse during the luminance signal said switch is connected to the output of a delay device for one line whereas for an interference pulse during a color difference signal said switch is connected to the output of a delay device for two lines. For MAC and SECAM signals a switch is provided having three inputs the first input being supplied with a direct and substantially undelayed signal, the second input being supplied with a signal delayed by one line and the third input being supplied with a signal delayed by two lines. In another form of the invention a second delay device of a period just longer than the operation period of the level detector and switch is provided within the undelayed signal path of said switch, the input of said level detector being connected to the input of said second delay device. Thereby the interference pulse at the control input of the switch can be present a short time before interference within the signal fed to one input of said switch begins. In another form of the invention a memory is provided wherein the time of occurrence of the interference pulse is stored said stored pulse being used for signal processing of the signal stored within a frame memory.

BRIEF DESCRIPTION OF THE DRAWING

In order that the invention may more readily be understood a description is now given by way of example only, reference being made to the drawing. Within the drawing

DESCRIPTION OF THE PREFERRED EMBODIMENTS

Figure 1:
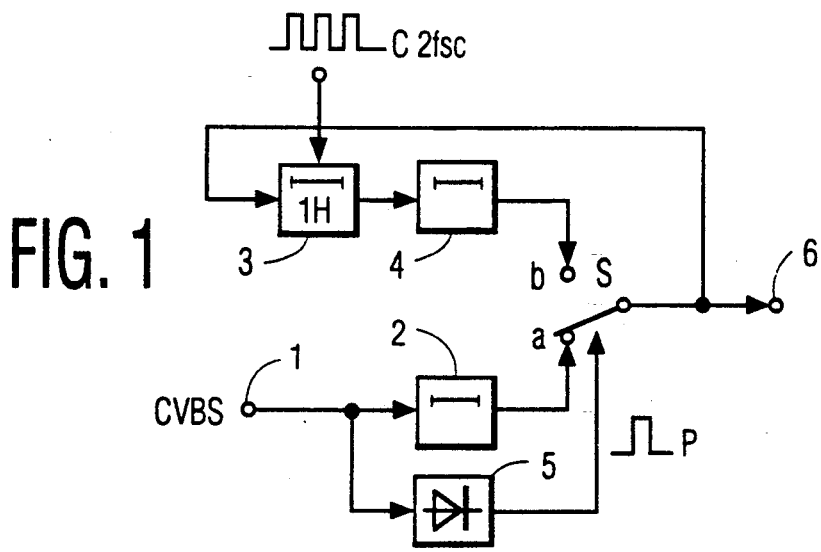
FIG. 1 shows the block diagram of the invention using the signal of a previous line as substitute signal.

In FIG. 1 a composite video signal CVBS (color video blanking sync) is fed from terminal 1 via delay device 2 having a delay of about 25–45 ns to first input of a switch S. Output of switch S is connected to the input of a delay device 3 for one line period the output of which is fed via delay device 4 to input b of switch S. Composite video signal from terminal 1 is further fed to amplitude level detector 5 producing an interference pulse P. Pulse P is fed to control input of switch S.

The operation is as follows: During normal reception with on interference signal CVBS is fed from terminal 1 via delay device 2 and switch S to output terminal 6 without substantial modification except the small delay due to delay device 2. In this mode switch S remains in position a. If an interference pulse is detected by detector 5 modification pulse P is generated and actuates switch S to position b. Now instead of the degraded signal at the output of device 2 the corresponding signal of the previous line is inserted by using the output of delay device 3. It is unlikely that the signal of the previous line also has a spuriosity at the corresponding time of the line period. On the other hand there is usually a substantial correlation between the wanted information at corresponding points on successive lines.

Therefore, the signal of the previous line can be used as a substitute signal and filling up the time where the original signal is degraded. So at output 6 a signal is available wherein the interference is substantially eliminated.

Delay device 3 is a CCD (Charge Coupled Device) delay line and controlled by clock pulses C with double color sub-carrier frequency 2*fsc. Clock pulses C are locked to the burst and delay device 3 has half a cycle less delay than the exact line period. Device 3 is controlled in such a way that the color sub-carriers at input a and b of switch S have the same phase in spite of PAL offset and PAL phase alternation. It is also possible to eliminate PAL phase alternation by a so-called color carrier modifier. Such a circuit is also controlled by a clock signal C with a frequency of 2*fsc and "mirrors" the color carrier in every second line to the fixed U-axis. This means that the PAL color phase alternation is eliminated so that the color sub-carrier has no phase alternation and is similar to that in the NTSC signal.

Figure 2:
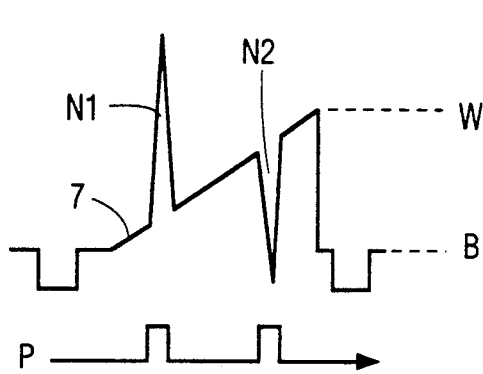
FIG. 2 shows interference pulses within the signal and the corresponding modification pulses.

In FIG. 2 the composite video signal 7 has two interference pulses N1 and N2, N1 being a transient to beyond peak white level W and interference pulse N2 going to beyond black level B. Both spuriosities N1 and N2 produce video interference pulses P by amplitude detection.

Figure 3:
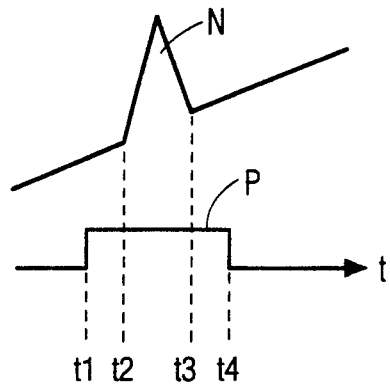
FIG. 3 shows the relationship between one interference pulse and the modification pulse generated thereupon and FIG. 4 a modification of the circuit of FIG. 1 adapted for reception of MAC or SECAM signals.

In FIG. 3 the insertion pulse produced by detector 5 begins at t1 a short time before the beginning t2 of interference pulse N. The time interval between t1 and t2 is usually a few nano-seconds. This is effected by delay device 2 causing the signal to reach input a after pulse P is produced. Pulse P ends at t4 after the end of interference N at t3. So insertion pulse P is lengthened or stretched with respect to interference N in order to extend over the full time of interference N even with tolerances.

Figure 4:
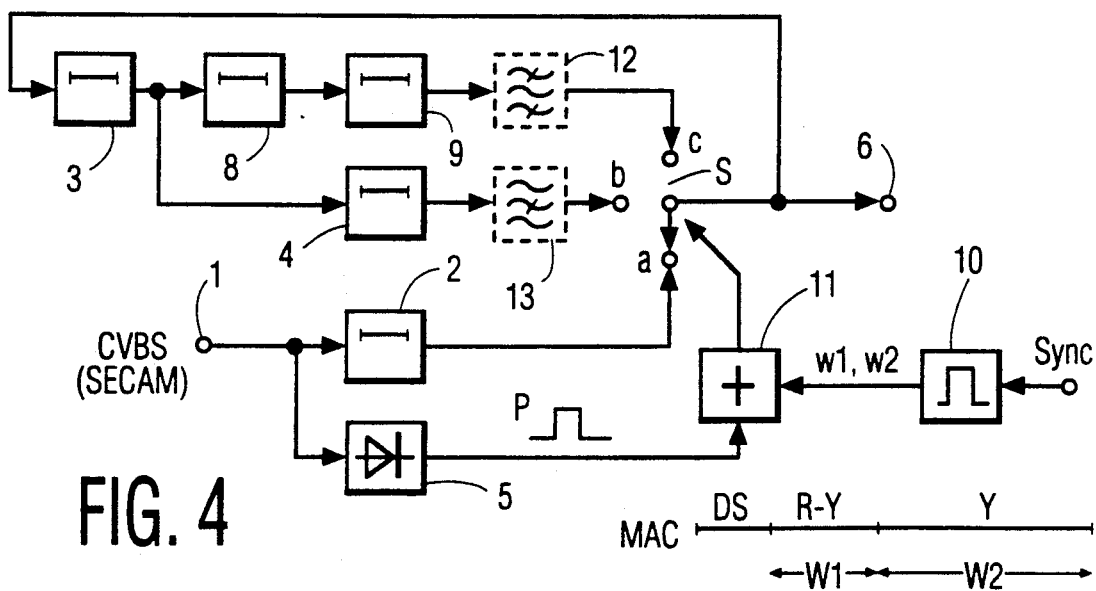

FIG. 4 shows a circuit adapted to process MAC signals and SECAM signals by the introduction of small modifications. Additionally to delay devices 3 and 4 according to FIG. 1 connected to input b of a further path is provided including a further delay device 8 of one line period and an incremental delay device 9 connected to a third input c of switch S. First the operation for MAC mode is described. With MAC signals two features have to be taken into account. First during each horizontal line there are transmitted sequentially a color difference signal and a luminance signal both compressed in time. Therefore, it is necessary to take into account whether the interference and the pulse P occur during said color difference signal or during said luminance signal. Secondly the two MAC color difference signals are transmitted on successive lies. Therefore, during an interference within color difference signal the color difference signal of the previous line cannot be used as a substitute signal because it carries the wrong color difference information. Therefore, it is necessary to use within line n the color difference signal from line (n−2).

In FIG. 4 two window signals W1, W2 are generated within window generator 10. The first window signal W1 indicates the time of the color difference signal whereas the second window signal W2 defines the time of the luminance signal. The window signals W1, W2 are combined with pulse P in stage 11 the output of which is controlling switch S in the following way: If the pulse P occurs during luminance signal Y the window signal W2 acts upon the control of switch S in such a way that the switch S is connected to input b so that the signal of the previous line is inserted as in FIG. 1. If pulse P arises during color difference signal R−Y window signal W1 acts upon control of switch S in such a way that switch S is connected to input c. Now during line n the signal of line n−2 delayed by two lines by delay devices 3, 8 is inserted as the substitute signal. If for example the interference is within signal R−Y in line n during pulse P the corresponding color difference signal R−Y of line n−2 is inserted. The bandpass filter 12 and the notch filter 13 shown are not used and not provided for MAC mode.

If circuit according to FIG. 4 is adapted for SECAM window generator 10 and stage 11 are not present whereas bandpass filter 12 and notch filter 13 are introduced. The operation is similar to that of MAC. If the substitute signal is to be inserted only within luminance signal Y upon occurrence of pulse P switch S is connected to input b as described with FIG. 1. If, however, a substitute signal is to be introduced within the color difference signal than switch S is connected to input c which is a signal delayed by two lines. Bandpass filter 12 is designed to transmit only FM SECAM color carrier and its sidebands and suppressing the luminance components outside said frequency band of the color carrier. Notch filter 13 is adapted to suppress color carrier frequency and corresponding sidebands.

I claim:
1. In a receiver for receiving television satellite signals at an input terminal, a circuit for eliminating interference in said television signals, apparatus comprising:
   switch means having at least first, second and third switchable contacts and an output terminal;
   level detection means responsive to said television signals for providing interference representative pulses for causing said switch means to switch between said first, second and third contacts in response to amplitude changes in said television signals whereby said amplitude changes are prevented from being applied to said output terminal, said interference representative pulses having time durations greater than the time durations of said amplitude changes;
   first means coupled between said input terminal and said first switchable contact for coupling said television signals to said first contact;
   second means coupled between said output terminal and said second contact for delaying said television signals for one line period and for applying said one line period delayed television signals to said second switchable contact; and
   third means coupled between said output terminal and said third contact for delaying said television signals for two line periods and for applying said two line period delayed television signals to said third switchable contact.

2. The circuit of claim 1 wherein said second and said third means each comprise a CCD delay line.

3. A method of eliminating interference induced amplitude changes from television signals supplied to a television receiver which receives satellite signals comprising the steps of:
   coupling said television signals to a first contact of a switch, said switch also having an output terminal;
   delaying signals developed at said output terminal for one line period and applying said one line period delayed signals to a second contact of said switch;

delaying signals developed at said output terminal for two line period and applying said two line period delayed signals to a third contact of said switch;

detecting amplitude changes in said supplied television signals and generating interference representative pulses having time durations greater than the time durations of said amplitude changes and using said interference representative pulses to switch said switch from said first contact to said second contact or said third contact during the duration of said interference representative pulses.

4. In a television system, apparatus comprising:

an input terminal at which television signals are provided;

switch means having at least first, second and third switchable contacts and an output terminal;

level detection means responsive to said television signals for providing amplitude change representative pulses for causing said switch means to switch between said first, second and third contacts in response to predetermined amplitude changes in said television signals whereby said predetermined amplitude changes are prevented from being applied to said output terminal, said change representative pulses having time durations greater than the time durations of said predetermined amplitude changes;

first means coupled between said input terminal and said first switchable contact for coupling said television signals time to said first contact;

second means coupled between said output terminal and said second contact for delaying said television signals for one line period and for applying said one line period delayed television signals to said second switchable contact; and third means coupled between said output terminal and said third contact for delaying said television signals for two line periods and for applying said two line period delayed television signals to said third switchable contact.

5. The apparatus recited in claim 4 wherein:

said television signals include line synchronization pulses defining the beginnings of respective line periods; and further including timing means responsive to said line synchronization pulses for generating at least first and second timing pulses occurring at different portions of said line periods; and means for combining said first and second timing pulses with said amplitude change representative pulses to produce resulting pulses for controlling said switch means.

6. The apparatus recited in claim 5 wherein:

said television signals include a time compressed luminance component signal and a time compressed color difference component within ones of said line periods, alternate ones of said line periods including different color difference components; and said first and said timing pulses occur at times corresponding to the times in which said compressed luminance and compressed color difference signals occur.

7. In a television system, apparatus comprising:

an input terminal at which television signals are provided, said television signals including synchronization pulses defining the beginnings of respective scanning periods;

first delay means for providing a first time delay;

second time delay for providing a second time delay;

switch means having at least first, second and third switchable positions and being coupled to said input terminal, to said first and second delay means, and to an output terminal for selectively coupling said television signals to said output terminal without being delayed by said first or second time delays in said first position, coupling said television signals to said output terminal delayed by said first time delay in said second position, or coupling said television signals to said output terminal delayed by said second time delay in said third position;

level detection means responsive to said television signals for providing amplitude change representative pulses for causing said switch means to switch between said first, second and third positions in response to predetermined amplitude changes in said television signals whereby said predetermined amplitude changes are prevented from being applied to said output terminal; and timing means responsive to said synchronization pulses for generating at least first and second timing pulses occurring at different portions of ones said scanning periods; and means for combining said first and second timing pulses with said amplitude change representative pulses to produce resulting pulses for controlling said switch means in accordance with the portion of ones of said scanning periods in which ones of said predetermined amplitude changes occur.

* * * * *